United States Patent [19]
Vishlitzky

[11] Patent Number: 5,724,321
[45] Date of Patent: Mar. 3, 1998

[54] STORAGE AND RETRIEVAL SYSTEM FOR A PLURALITY OF DATA STORAGE MEDIUMS

[75] Inventor: Natan Vishlitzky, Brookline, Mass.

[73] Assignee: EMC Corporation, Hopkinton, Mass.

[21] Appl. No.: 361,136

[22] Filed: Dec. 21, 1994

[51] Int. Cl.[6] .................................................. G11B 17/22
[52] U.S. Cl. .............................. 369/30; 369/34; 369/38
[58] Field of Search ................................. 369/30, 33–34, 369/36–38, 39, 75.2, 75.1, 178; 395/427; 360/98.04, 98.05, 98.06, 98.08, 90, 92

[56] References Cited

U.S. PATENT DOCUMENTS

| | | | |
|---|---|---|---|
| 4,685,095 | 8/1987 | Rudy et al. | 369/36 |
| 4,907,889 | 3/1990 | Simone | 360/92 |
| 5,065,265 | 11/1991 | Pierrat | 360/92 |
| 5,128,912 | 7/1992 | Hug et al. | 369/38 |
| 5,133,632 | 7/1992 | Aramaki | 414/283 |
| 5,236,258 | 8/1993 | Bunch | 312/9.31 |
| 5,319,621 | 6/1994 | Amar | 369/34 |
| 5,386,516 | 1/1995 | Monahan et al. | 395/275 |
| 5,434,832 | 7/1995 | Beal et al. | 369/36 |
| 5,450,385 | 9/1995 | Ellis et al. | 369/34 |

FOREIGN PATENT DOCUMENTS 2232524  12/1990  United Kingdom.

Primary Examiner—Ali Neyzari
Attorney, Agent, or Firm—Mark J. Casey; John M. Gunther

[57] ABSTRACT

A storage and retrieval system for a plurality of data storage media includes a 3-dimensional data storage media storage cabinet having a plurality of moveable data storage media storage locations, at least one of which is empty or unused. Each data storage media storage location is moveable along at least two orthogonal axes, to facilitate retrieval of a selected one data storage media. Each data storage media is indexed in a data storage media system controller. When access to a predetermined one data storage media is requested by a command or request from a data processing system such as a host computer, the data storage media system controller, utilizing the index, determines the media transport control signals required to effectuate the quickest access to the media. A retrieval mechanism retrieves the media from a retrieval region in the storage cabinet and places the media into and out of a read/write mechanism, to allow access to the data storage media. The storage cabinet is preferably arranged in a number of rows, each row including at least one empty storage location, to allow movement or shuffling of the data storage media within each row.

25 Claims, 3 Drawing Sheets

STORAGE AND RETRIEVAL SYSTEM FOR A PLURALITY OF DATA STORAGE MEDIUMS

FIELD OF THE INVENTION

This invention relates to data storage systems and more particularly, to a system for storing and retrieving storage media such as tapes, cassettes and disks.

BACKGROUND OF THE INVENTION

Computer systems utilize many types of data storage which maintain availability of data to the computer system for later retrieval and use. The particular type of data storage medium or data storage system utilized to store data is a function of when and how often the data will be accessed.

For example, in those situations when the computer system needs to access data very quickly and typically very often, high speed, direct access, data storage such as semi-conductor memory is most appropriate. On the other hand, at the other extreme is data which is not frequently accessed such as data processing system back-ups, out of date business records, etc. This type of data is typically stored "off-line" on data storage media such as tapes, cassette, CD ROM etc. The data, however, still needs to be reasonably readily available in case the data is needed.

In order to handle retrieval of such "off-line data", either the computer system or a coupled data storage system will maintain an index of data stored off-line along with some indication of which data storage media the data is stored on. When needed, a data storage system, including a storage media storage cabinet such as a tape silo, will locate the desired storage medium and mount the medium on a data read/write system such as a tape drive or disk drive, for reading or writing by a coupled host computer system.

In the past, there have been significant attempts at making the storage mediums rather quickly accessible. Accordingly, data storage media "silos" have predominated the industry. These "silos" are generally circular shaped "carousels" which store one row deep of data storage media along their outside periphery. Media retrieval mechanisms are generally located in the central interior region of the "silos" or along an exterior region. An example of such a system is disclosed in U.S. Pat. No. 5,236,258.

When the host or other data processing device requires access to a selected data storage medium, the "silo" containing the selected medium is made to rotate to a predetermined position wherein lies a mechanical device to remove the selected storage medium from the "silo" and mount it on a read/write device. In such systems, the mechanical device which removes the long term storage medium will typically be allowed to travel only along one axis, generally vertically, parallel to the outside surface of the "silo".

A significant problem arises with such "silos" in that for a given "silo" size or footprint, there is a significant amount of wasted space since the storage media such as tapes are stored only along the outside periphery of the "silo", one row deep and several columns high.

Accordingly, storage "silos" measuring over ten (10) feet high and over four (4) feet in diameter are not uncommon to store only a few thousand tapes, cassettes or other storage media. There is a tremendous amount of wasted space in the center of the "silo" which goes unused, as well as a tremendous amount of wasted floor space.

Although data accessibility is one criterion which drives the design of such media storage systems, most users are now faced with a more serious problem of the availability of floor space to house such systems. Therefore, large, bulky systems occupying a tremendous amount of floor space are now less desirable than smaller, although perhaps somewhat slower, media storage and access systems which occupy much less floor space for a given number of storage media.

Accordingly, what is required is a storage and retrieval system for a plurality of storage media which occupies much less floor space for a given number of data storage media than the prior art systems, while maintaining individual storage media accessibility in a reasonably short amount of time.

SUMMARY OF THE INVENTION

The present invention features a storage and retrieval system for a plurality of data storage media such as tapes and disks. The system of the present invention includes a three-dimensional media storage cabinet having a plurality of moveable storage media storage locations arranged in rows and/or columns. Each row or column includes a plurality of storage media storage locations at least one of which is empty. The at least one empty storage media location allows the storage media stored in the row or column to be "shuffled" or moved within the row or column, thus allowing a requested storage media to be presented to a media retriever device.

Although at least one empty media storage location is required, more empty media storage location will speed-up and facilitate movement or "shuffling" of the data storage media within the row or column. Each storage location is movable along at least two (2) axes to facilitate retrieval of a selected one (1) of the data storage media stored in the cabinet.

In a preferred embodiment, the storage cabinet is generally rectangular in shape and arranged in a plurality of rows. Each media storage location within a given row is moveable at least along two (2) axes which lie in the plane of the rows. A storage media index or a table, which is part of a system controller, stores information relative to the identification and position of each storage media within each row in the cabinet. When a request is made for a predetermined one data storage media in the storage cabinet, the system controller determines which row the storage media is stored in. A mechanical two (2) axis movement system is then activated which moves or shuffles each of the storage media within the row in order to present or provide the one requested storage media proximate a retrieval or pick-up region within the row.

A data storage media retrieval mechanism, disposed proximate the row pick-up region, is responsive to a signal from the data storage media system controller, for retrieving the selected data storage media once it has been provided to the retrieval region and for mounting the storage media in an appropriate data storage media reading and/or writing device.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
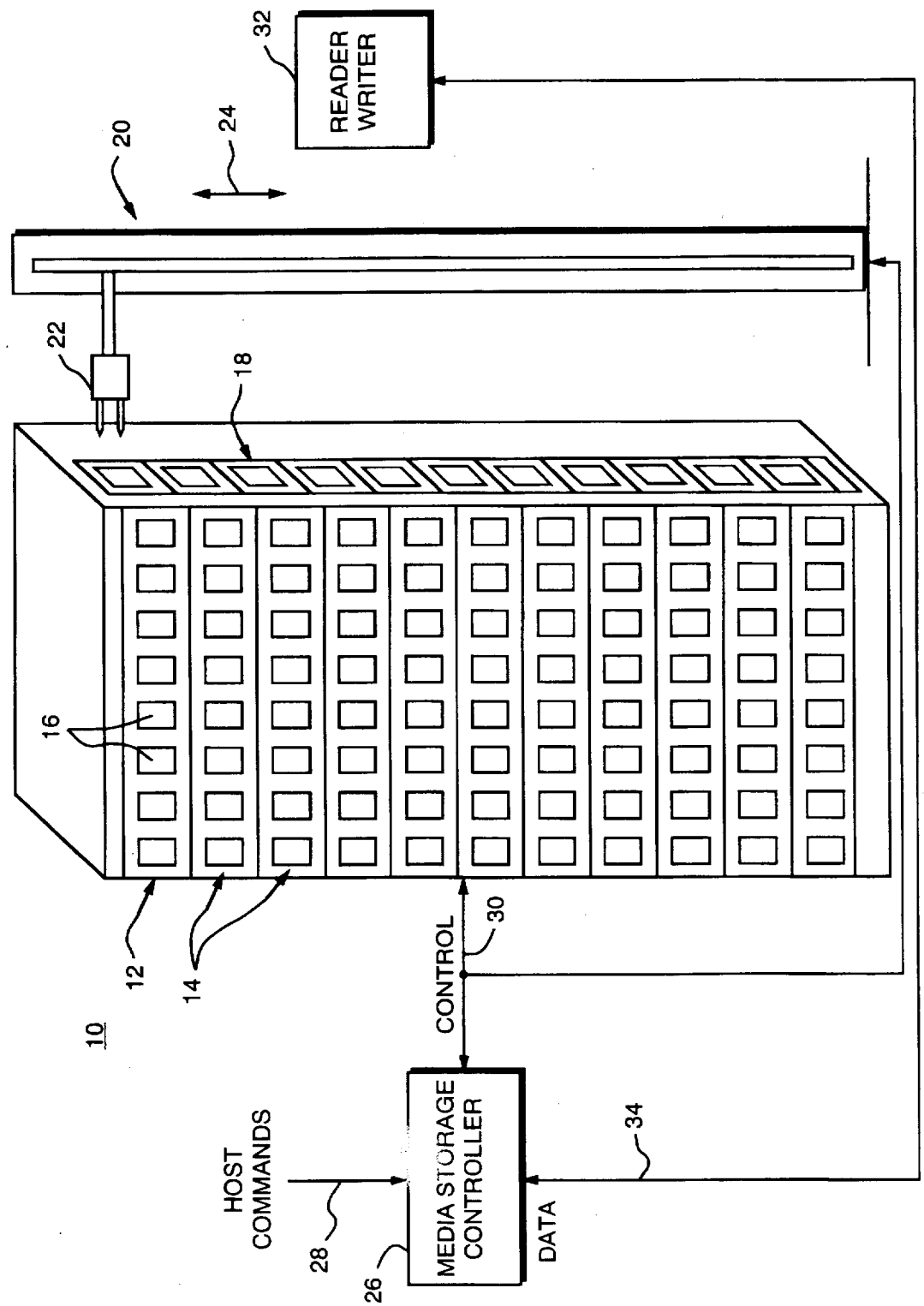
FIG. 1 is a schematic diagram of the storage and retrieval system for a plurality of longer term data storage media according to the present invention.

The present invention features a data storage media system and retrieved 10, FIG. 1, for storing and retrieving data storage media. The present invention includes a media storage cabinet 12 arranged in a plurality of rows or columns, each row or column including a plurality of storage locations for containing a corresponding plurality of data storage media.

In the exemplary embodiment, the data storage media storage cabinet 12 is a rectangular shaped cabinet including a plurality of rows 14 of closely spaced data storage media 16. The size of storage cabinet 12 should be selected to provide the smallest cabinet possible to house the requisite number of storage media which are desired to be stored in the storage cabinet 12.

Storage media may range from traditional magnetic tape in rolls or cassettes, to disks such as optical disks, CD ROM or rather similar media. Although the exemplary cabinet is illustrated as having a plurality of rows, another embodiment of the present invention contemplates the cabinet being divided into a plurality of columns. In addition, the present invention also contemplates a cabinet divided into both rows and columns, all without departing from the spirit of the present invention.

In accordance with the present invention, each row 14 includes a drive mechanism which allows each data storage media 16 contained within a row to be moved or shuffled so as to present a selected one data storage media proximate a retrieval region 18 in each row 14. A retrieval mechanism 20, in the exemplary embodiment, includes a retrieval device 22 including gripper elements 23 which are adapted to pick up a selected one longer term data storage media presented in a retrieval region 18 of a particular row 14.

Retrieval mechanism 20 includes appropriate drive mechanisms to allow retrieval device 22 to be moved vertically, along an axis indicated generally by arrow 24, parallel to the retrieval region 18 of storage cabinet 12. Such retrieval mechanisms including mechanical retrieval devices are well known in the art and include, for example, a mechanism disclosed in U.S. Pat. No. 4,907,889.

Retriever mechanism 22 further includes, in the preferred embodiment, an encoded indicia reader 25, such as a bar code reader, which is used to read encoded indicia, such as bar codes, placed on the exterior of the data storage media, in order to build, maintain, and verify the data storage media index table as will be explained further below.

The present system further includes a storage media controller 26, (explained in greater detail below) which is preferably implemented in software although a hardware implementation is considered within the scope of the present invention. The storage media controller 26 is responsive to commands 28 from a host computer or other similar data processing device, directing the storage system to retrieve a predetermined one data storage media to be written to or read from. The storage media controller 26 of the present invention interprets host commands 28 requesting access to a predetermined data storage media or requesting access to a predetermined file or record which is converted by the storage media controller 26 into a predetermined one data storage media 16 to be selected.

The storage media controller then provides motor control signals 30 to the appropriate media row transport mechanism 40 of a selected row 14, to provide the selected one data storage media 16 proximate the retrieval region 18 of the predetermined row 14.

Retriever mechanism control signals 30a are also provided to retriever mechanism 20, for retrieving the preselected data storage media 16, and for inserting the selected and retrieved data storage media into reader/writer mechanism 32. Reader/writer mechanism 32 includes a tape drive, cassette tape reader, or disk reader, all based upon the type of storage media used.

Once the selected data storage media 16 has been retrieved and inserted in the reader/writer mechanism 32, data from the selected data storage media 16 (in the case of a read operation) is provided to the storage media controller 26 over signal path 34, and subsequently to a coupled host computer or other data processing system. In the case of a write operation, data is written from the coupled host or data processing system to the storage media controller 26, through the read/write mechanism 32, and onto the selected data storage media 16.

Figure 2:
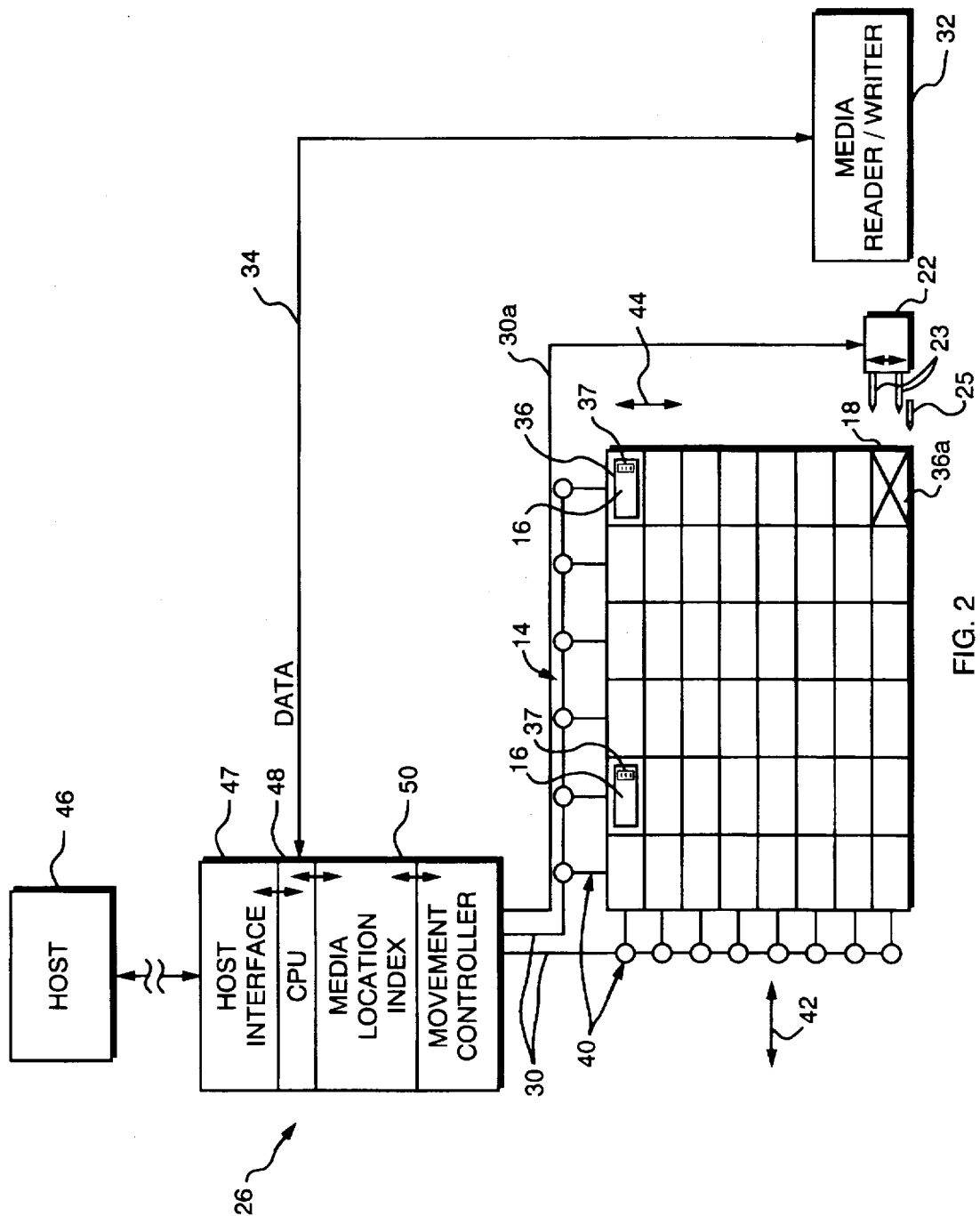
FIG. 2 is a schematic diagram of one row of longer term data storage media including media row drive mechanisms and a retrieval mechanisms.

In the preferred embodiment of the present invention, each row 14, FIG. 2, of data storage media cabinet 12 includes a plurality of closely spaced storage media storage locations 36 in which may be stored a corresponding plurality of data storage media 16. In the preferred embodiment, at least one data storage media storage location, such as location 36a, is left vacant or empty, thus allowing the shuffling or movement of the data storage media 16 within the row 14.

One empty or unused data storage media storage location is necessary to allow the data storage media 16 stored within a given row 40 to be moved or shuffled within the row. More than one empty or unused data storage media storage locations 36a can be provided to speed up the ability of the present system to provide the selected data storage media 16 to the retriever device 22. Thus, the number of unused or empty data storage media storage locations 36a can be adjusted to suit the access time requirements of a given user or site. The quicker the desired access time, the higher the number of empty or unused locations 36a.

Each row (or alternatively, each column) of the data storage media storage cabinet 12 includes a media transport mechanism 40 which, in the exemplary embodiment, includes a mechanism to move each storage media storage location 36 and accompanying data storage media 16 along at least two orthogonal axes within the plane of the row 14, as illustrated generally by arrows 42 and 44.

The media transport mechanism 40, for exemplary purposes, may include one or more precisely controllable D.C. stepper motors coupled to a lead screw. Other equivalent transport mechanisms are available as known in the art and are considered to be within the scope of the present invention.

Each transport mechanism 40 is coupled by one or more control signal paths 30 to the storage media controller 26. Upon receiving a request from a host or other similar data processing system 46 which needs to store and retrieve data (not part of the present invention), the host interface portion 47 of the storage media controller 26 decodes the received request, (read, write, or load storage media command, for example) to determine which operation the host or data processing device 46 wishes to perform on the data storage media 16. A central processing unit 48, under control of a software program as is well known in the art, which are part of the storage media controller 26, will determine, from a data storage media index or table 50, the exact present location of the data storage media to be accessed, utilizing one or more algorithms which are known in the art to compute position and access response time for a selected data storage media 16.

The index or table 50 of data storage media 16 stored on the system is maintained by the storage media controller 26 and includes which row a given data storage media 16 is located on and the present X-Y coordinate of the data storage media 16. The index or table 50 may be entered manually from a coupled host or data processing device, or from an input device such as a keyboard and terminal not shown but well known in the art) coupled to the data storage system. The index or table 50 can also be built and verified using a bar code or other similar encoded indicia 37 on the data storage media 16 and a bar code or encoded indicia reader 25 on or proximate the retriever mechanism 22.

In this embodiment, when the data storage system 10 is not filling requirements for a data storage media, or during some period of less than full activity, the storage controller 26 may enter a self verification mode wherein the data storage media 16 within each row 14, one row at a time, will be shuffled or moved to the position proximate the encoded indicia reader 25. the encoded indicia reader will read the encoded indicia, and transmit the decoded indicia to the storage system controller 26. Using positional information maintained by the storage controller 26, the storage controller can verify that the storage media 16 that is stored in any given storage media storage location 36 corresponds to the storage media that was believed to be stored in that location. If an error is detected, the storage system controller 26 can update the index or table 50 with the correct information. In this manner, the storage system controller 26 can account for any errors or misplacement of storage media and maintain an accurate list of the locations of each data storage media 16.

This verification procedure can also be used to build the table or index 50 of data storage media 16 stored in the system. Using this procedure, personnel can load the system with data storage media 16. The storage controller 26 will then scan each data storage media storage location 36 to build the table or index 50.

Once the storage system controller 26 receives a request or command from the coupled host or data processing device, the central processor 48 will determine the number of movements, within a given row 14, required to position selected one data storage media 16 proximate retrieval region 18 in the storage cabinet 12, for subsequent removal by retriever mechanism device 22.

Once media transport mechanism control signals have been output over signal path 30 and retriever mechanism control signals provided over signal path 30a. retriever mechanism device 22 and gripper elements 23 will retrieve the selected one data storage media 16 and insert it into the media reader/writer 32. Data from the selected data storage media now inserted into media reader/writer 32 is then transmitted to storage media controller 26 for subsequent transmission to host 46 or data processing device.

Figure 3:
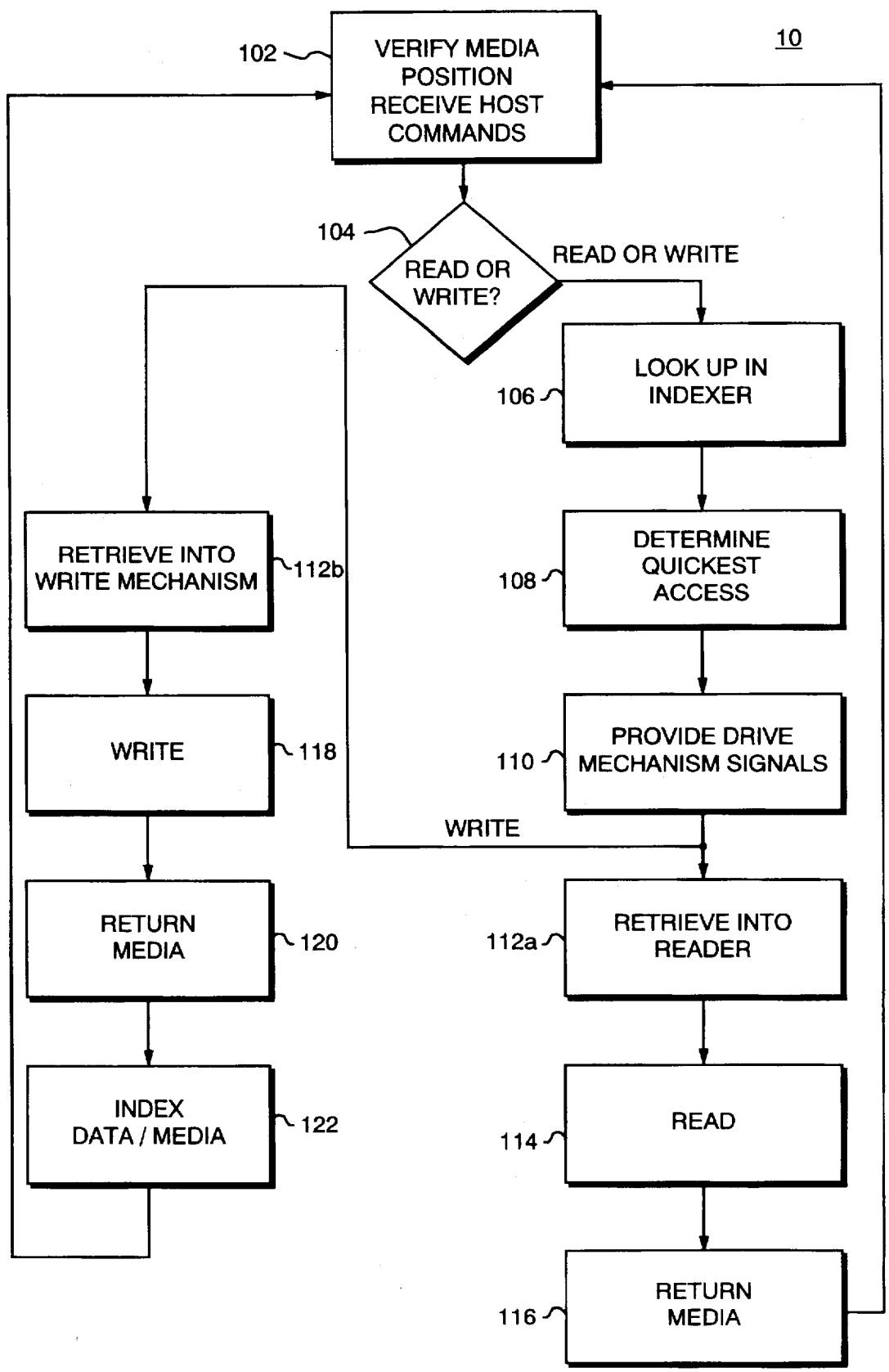
FIG. 3 is a flow chart illustrating the method for selecting one longer term data storage media to be read from or written to, according to one aspect of the present invention.

The present invention operates in accordance with flow chart 100, FIG. 3, wherein at step 102, host 46 requests or commands are received. At step 104, the system determines whether the host command requires that a data storage media be loaded, or that data is to be read from or written to a predetermined data storage media 16. In any case, except for the case when data is to be written to a new, not previously indexed data storage media 16, the data storage system controller 26 system must first read the media index 50 to determine the exact position of the data storage media 16 to be loaded, read from or written to, step 106. The storage controller 26 next determines the quickest way to access the selected data storage media within a given row 14 or column by computing the least number of moves necessary to present the selected data storage media 16 proximate the retrieval region 18 of the cabinet 12 and retriever mechanism, step 108.

Once the necessary moves have been determined, the data storage controller 26 provides the requisite media transport 30 and retriever mechanism 22 control signal(s), step 110, culminating in the selected data storage media 16 being verified as the proper data storage media using an encoded indicia such as bar code, the index 50 updated, if necessary, and the selected data storage media 16 retrieved and inserted into the read/write mechanism 32, steps 112a–112b.

If the data storage system controller 26 determines that the host 46 has requested a read operation, processing continues to step 114 wherein data is read followed by the data storage media 16 being returned to the system. The system then waits for subsequent host commands, step 102 while performing data storage media location verification using encoded indicia on the data storage media 16.

If data is to be written to a data storage media 16, once the data storage media 16 has been inserted into the write mechanism 32, step 112b, data is written to the data storage media 16, step 118, following which the data storage media is returned to the data storage system cabinet 12, step 120.

Generally, when new data is written to an existing data storage media 16 or a new data storage media 16 inserted into the data storage media read/write mechanism 32, the data storage media index 50 is updated to reflect the new data or media, step 122, following which the processing returns to step 102 to await receipt of additional requests or commands from the host and continued data storage media positional verification.

Accordingly, the present invention provides data storage media storage system which is compact in size having a small "footprint" for the number of data storage media it can hold; and which utilizes a storage cabinet with a high density of closely packed data storage media divided into at least one of rows or columns. At least one empty data storage media storage location in a row or column facilitates movement or "shuffling" of the data storage media within the row or column, although more than one empty location can be provided to speed up movement or "shuffling" within the row or column.

Using positional information about the data storage media in each row or column contained in an index or look up table, the data storage media system controller can quickly and efficiently compute the most time efficient access to the selected data storage media.

Modifications and substitutions by one of ordinary skill in the art are considered to be within the scope of the present invention which is not to be limited except by the claims which follow.

What is claimed is:

1. A system for storing and retrieving data storage media, said system comprising:

a data storage media storage cabinet including a plurality of data storage media storage locations, at least one of said plurality of data storage media storage locations not including a data storage media;

at least one data storage media transport mechanism, coupled to each of said plurality of data storage media storage locations, and responsive to a data storage media transport mechanism control signal, for moving said plurality of data storage media in each respective data storage media storage location along at least first and second axes, said first axis orthogonal to said second axis, and for providing a predetermined one of said plurality of data storage media stored in a preselected one of said plurality of data storage media storage locations to a retrieval region in said data storage media storage cabinet;

a data storage media retrieval mechanism, responsive to a retrieval mechanism control signal directing movement of said data storage media retrieval mechanism along at least one axis parallel to at least one of a row and a column of said data storage media storage cabinet proximate said retrieval region in said data storage media storage cabinet, for retrieving a predetermined one data storage media of said plurality of data storage media, and for placing said retrieved predetermined one data storage media into a media read/write mechanism; and a data storage media system controller, responsive to commands requesting access to a predetermined one of said plurality of data storage media, for providing said media transport mechanism control signal directing said movement of said data storage media transport mechanism, for providing said retrieval mechanism control signal directing retrieval of said predetermined one data storage media.

2. The system of claim 1, wherein said data storage media storage cabinet includes a plurality of rows of data storage media, each row including a plurality of data storage media storage locations.

3. The system of claim 2, wherein each row of said plurality of rows includes at least one empty data storage media storage location not including a data storage media.

4. The system of claim 1, wherein said data storage media include tapes.

5. The system of claim 1, wherein said data storage media include disks.

6. The system of claim 5, wherein said disks include optical disks.

7. The system of claim 1, wherein said retrieval mechanism moves vertically along one vertical axis.

8. The system of claim 1, wherein said data storage media system controller includes a data storage media index, for maintaining data storage media positional information.

9. The system of claim 8, wherein said data storage media system controller includes processor means, responsive to said commands and to said data storage media index, for computing a series of media transport mechanism control signals for most rapidly positioning said predetermined one data storage media proximate said retrieval region of said data storage media storage cabinet.

10. The system of claim 9 wherein said commands are received from a coupled data processing system.

11. The system of claim 10 wherein said data processing device includes a host computer.

12. The system of claim 1 wherein each of said data storage media include encoded indicia proximate an exterior region of said data storage media.

13. The system of claim 12 wherein said encoded indicia includes a bar code.

14. The system of claim 12 wherein said retrieval mechanism includes an encoded indicia reader, for reading said encoded indicia from said exterior region of said data storage media.

15. The system of claim 14 wherein said data storage media system controller is responsive to a decoded indicia signal received from said encoded indicia reader, for at least updating said data storage media index.

16. The system of claim 15 wherein said data storage media system controller is responsive to said decoded indicia signal received from said encoded indicia reader for building said data storage media index.

17. A system for storing and retrieving data storage media, said system comprising:

a data storage media storage cabinet including a plurality of rows, each row including at least one data storage media, and a plurality of date storage media storage locations for containing data storage media, at least one of said plurality of data storage media storage locations not including data storage media;

at least one data storage media transport mechanism, coupled to each of said plurality of data storage media storage locations, and responsive to a data storage media transport mechanism control signal, for moving said at least one data storage media in each respective data storage media storage location along at least first and second axes in each row, said first axis orthogonal to said second axis, and for providing a predetermined one of said plurality of data storage media stored in a preselected one of said plurality of data storage media storage locations to a retrieval region in each row in said data storage media storage cabinet;

a data storage media retrieval mechanism, responsive to a retrieval mechanism control signal directing movement of said data storage media retrieval mechanism along one vertical axis proximate said retrieval region in each row in said data storage media storage cabinet, for retrieving a predetermined one data storage media of said plurality of data storage media, and for placing said retrieved predetermined one data storage media into a media read/write mechanism; and a data storage media system controller, responsive to commands requesting access to a predetermined one of said plurality of data storage media, for providing said media transport mechanism control signal directing said movement of said data storage media transport mechanism, for providing said retrieval mechanism control signal directing retrieval of said predetermined one data storage media.

18. The system of claim 17 wherein said data storage media is selected from the group consisting of tapes, magnetic disks and optical disks.

19. The system of claim 17 wherein each of said data storage media include encoded indicia proximate an exterior region of said data storage media; and said data storage media retrieval mechanism includes an encoded indicia reader, for readings said encoded indicia from said exterior region of said data storage media.

20. A system for storing and retrieving data storage media, said data storage media including encoded indicia proximate an exterior region of said data storage media, said system comprising:

a data storage media storage cabinet including a plurality of data storage media storage locations, at least one of said plurality of data storage media storage locations not including a data storage media;

at least one data storage media transport mechanism, coupled to each of said plurality of data storage media storage locations, and responsive to a data storage media transport mechanism control signal, for moving said plurality of data storage media in each respective data storage media storage location along at least first and second axes, said first axis orthogonal to said second axis, and for providing a predetermined one of said plurality of data storage media stored in a preselected one of said plurality of data storage media storage locations to a retrieval region in said data storage media storage cabinet;

a data storage media retrieval mechanism, including an encoded indicia reader for reading said encoded indicia from said exterior region of said data storage media, said data storage media retrieval mechanism responsive to a retrieval mechanism control signal directing movement of said data storage media retrieval mechanism along at least one axis parallel to at least one of a row and a column of said data storage media storage cabinet proximate said retrieval region in said data storage media storage cabinet, for retrieving a predetermined one data storage media of said plurality of data storage media, and for placing said retrieved predetermined one data storage media into a media read/write mechanism; and a data storage media system controller, responsive to commands requesting access to a predetermined one of said plurality of data storage media, for providing said media transport mechanism control signal directing said movement of said data storage media transport mechanism, for providing said retrieval mechanism control signal directing retrieval of said predetermined one data storage media.

21. A storage system comprising:

a plurality of storage media cabinets, each of said cabinets having a plurality of storage locations arranged as a plurality of rows and columns and a retrieval region, each storage location configured to hold a data storage element; and a transport mechanism coupled to each of said storage media cabinets and responsive to a signal received from a requesting device to transport a selected storage element, within an associated storage media storage cabinet, along rows and columns corresponding to said storage media storage cabinet to deliver said storage element to a retrieval region associated with said storage media cabinet such that a storage element in any of said storage media cabinets is made accessible to a common retrieval mechanism.

22. The storage system as in claim 21 wherein said retrieval mechanism further includes a pickup mechanism, said retrieval mechanism operable to position said pickup mechanism at said retrieval region, remove, using said pickup mechanism, said storage element from said retrieval region and transport said storage element to a storage device suitable for reading and writing to said storage element.

23. The storage system as in claim 21 wherein said rows and columns of each of said plurality of storage media cabinets lie separate parallel horizontal planes with all associated retrieval regions of all said storage media cabinets lying in a common vertical plane on a common vertical axis.

24. The storage system as in claim 23 wherein said retrieval mechanism is proximate said plurality of storage media cabinets and said pickup mechanism is positional along a second vertical axis, parallel to said common vertical axis, for accessing said retrieval regions.

25. The storage system as in claim 24 wherein at least one storage location of each of said storage media cabinets is unoccupied by a storage element such that a storage element stored in an adjacent storage location may be positioned into said unoccupied storage location.

* * * * *